United States Patent
Molthan et al.

(10) Patent No.: US 12,409,735 B2
(45) Date of Patent: Sep. 9, 2025

(54) VEHICLE WITH CURRENT COLLECTOR

(71) Applicants: Siemens Mobility GmbH, Munich (DE); Scania CV AB, Soedertaelje (SE)

(72) Inventors: Helge Molthan, Bad Feilnbach (DE); Holger Sommer, Aurachtal (DE); Henrik Engdahl, Askim (SE); Christer Thoren, Haegersten (SE)

(73) Assignees: Siemens Mobility GmbH, Munich (DE); Scania CV AB, Soedertaeljie (SE)

( * ) Notice: Subject to any disclaimer, the term of this patent is extended or adjusted under 35 U.S.C. 154(b) by 892 days.

(21) Appl. No.: 17/631,563

(22) PCT Filed: Jul. 7, 2020

(86) PCT No.: PCT/EP2020/069048
§ 371 (c)(1),
(2) Date: Jan. 31, 2022

(87) PCT Pub. No.: WO2021/018520
PCT Pub. Date: Feb. 4, 2021

(65) Prior Publication Data
US 2022/0274489 A1    Sep. 1, 2022

(30) Foreign Application Priority Data
Jul. 29, 2019 (DE) .................... 10 2019 211 230.7

(51) Int. Cl.
*B60L 5/00* (2006.01)
*B60L 3/00* (2019.01)
*B60L 9/20* (2006.01)
(Continued)

(52) U.S. Cl.
CPC .............. *B60L 5/00* (2013.01); *B60L 3/0069* (2013.01); *B60L 9/20* (2013.01); *B60L 53/14* (2019.02);
(Continued)

(58) Field of Classification Search
CPC .. B60L 5/00; B60L 53/20; B60L 53/14; B60L 3/0069; B60L 9/20; B60L 2200/30; B60L 221/01; B60L 2240/12
See application file for complete search history.

(56) References Cited

U.S. PATENT DOCUMENTS 9,868,355 B2 * 1/2018 Hatanaka .................. B60L 9/16
10,046,669 B2 * 8/2018 Buehs ................... B60L 3/0069
(Continued)

FOREIGN PATENT DOCUMENTS

CN   104960428 A   10/2015
CN   105774569 A   7/2016
(Continued)

*Primary Examiner* — Jason C Smith
(74) *Attorney, Agent, or Firm* — Laurence A. Greenberg; Werner H. Stemer; Ralph E. Locher

(57) ABSTRACT

A vehicle has a current collector for feeding traction energy from a two-pole overhead contact line system, an electric or hybrid electric traction drive, and an electric energy storage device for temporarily storing fed traction energy. A first line branch can connect the traction drive to the current collector. A second line branch, which can connect the traction drive and the energy storage device to the current collector, includes a switched-in, galvanically isolating DC-to-DC converter. Due to a third line branch which can connect the traction drive and the energy storage device to the current collector, and which includes a switched-in, non-galvanically isolating DC-to-DC converter, enables higher charging rates for charging the energy storage device to be transmitted while maintaining the protection system.

4 Claims, 1 Drawing Sheet

(51) Int. Cl.
*B60L 53/14* (2019.01)
*B60L 53/20* (2019.01)

(52) U.S. Cl.
CPC .......... *B60L 53/20* (2019.02); *B60L 2200/30* (2013.01); *B60L 2210/10* (2013.01); *B60L 2240/12* (2013.01)

(56) References Cited

U.S. PATENT DOCUMENTS

| | | | | |
|---|---|---|---|---|
| 11,909,304 | B2 * | 2/2024 | Ditterich | H02M 5/4585 |
| 11,964,570 | B2 * | 4/2024 | Schäfer | H02J 7/0013 |
| 12,017,546 | B2 * | 6/2024 | Rodionov | B60L 53/20 |
| 12,057,716 | B1 * | 8/2024 | Lujan | B60L 50/52 |
| 2011/0166736 | A1 | 7/2011 | Kitanaka | |
| 2015/0314681 | A1 * | 11/2015 | Riley, Sr. | A61B 5/7455 |
| | | | | 340/576 |
| 2015/0314687 | A1 | 11/2015 | Geradts | |
| 2016/0152129 | A1 * | 6/2016 | West | B60L 5/36 |
| | | | | 180/65.21 |
| 2016/0236590 | A1 * | 8/2016 | Buehs | B60L 9/18 |
| 2022/0274489 | A1 * | 9/2022 | Molthan | B60L 9/20 |

FOREIGN PATENT DOCUMENTS

| | | | | |
|---|---|---|---|---|
| DE | 102012211543 | A1 | 1/2014 | |
| DE | 102013226356 | A1 * | 4/2015 | .......... B60L 11/1809 |
| DE | 112013006718 | T5 * | 11/2015 | ............ B60L 3/0046 |
| DE | 102022104099 | B3 * | 4/2023 | ............ B60L 3/0069 |
| EP | 2340957 | A1 * | 7/2011 | ............. B60L 1/003 |
| JP | 2010041817 | A | 2/2010 | |
| WO | WO-2016068780 | A1 * | 5/2016 | ............. B60K 28/10 |

* cited by examiner

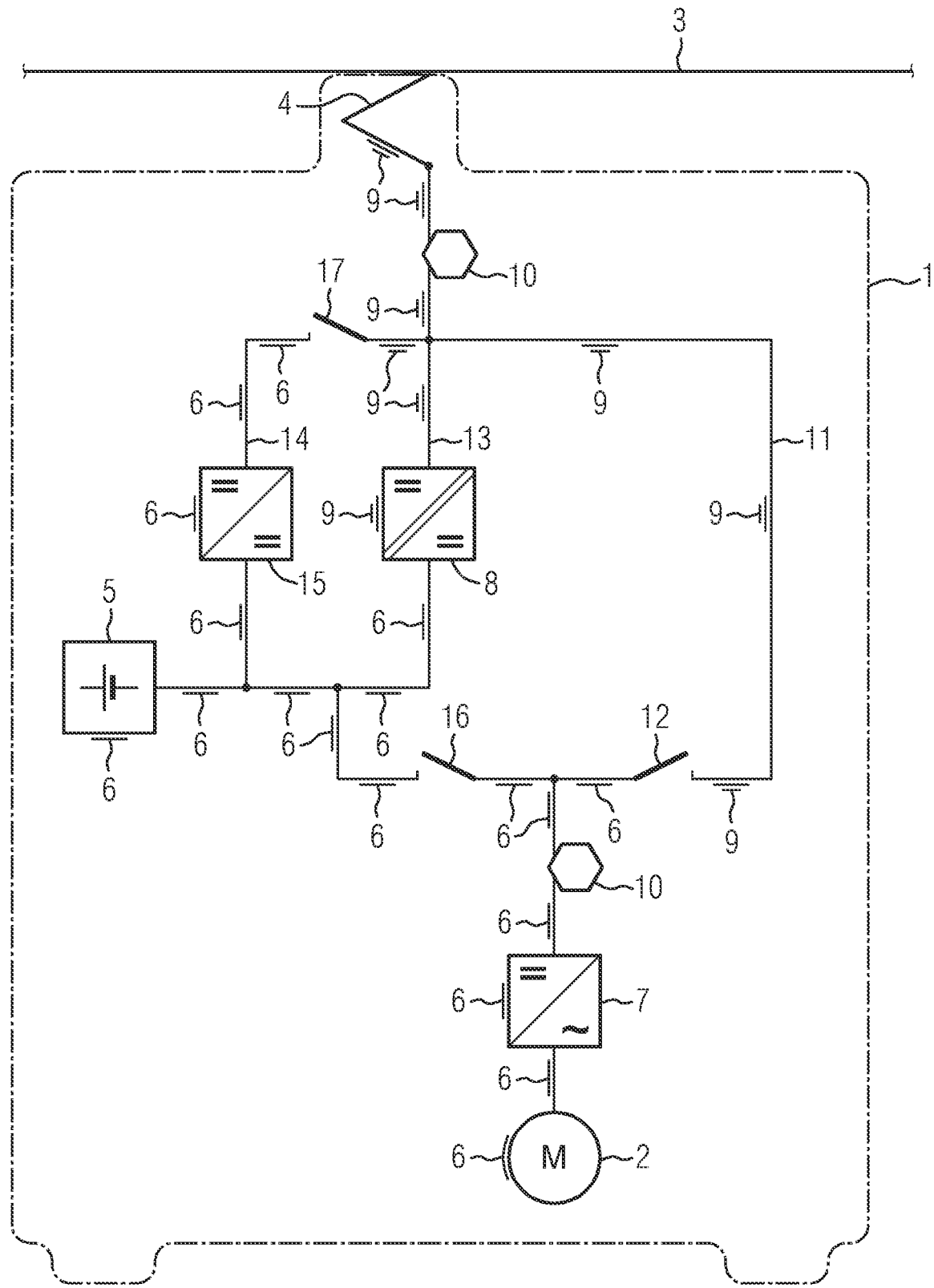

VEHICLE WITH CURRENT COLLECTOR

SPECIFICATION

FIELD AND BACKGROUND OF THE INVENTION

The invention relates to a vehicle with a current collector for feeding traction energy from a two-pole overhead contact line system, an electric or hybrid-electric traction drive, an electrical energy storage device for the intermediate storage of traction energy that is fed in, a first line branch that can connect the traction drive to the current collector, a second line branch that can connect the traction drive and the energy storage device to the current collector, and a galvanically isolating DC converter that is interposed in the second line branch.

In a vehicle having a purely electric traction drive or having a hybrid-electric traction drive, in which an electric motor can be coupled for example to a combustion engine or to a fuel cell, the traction drive is carried by a non-grounded vehicle frame. If the vehicle comprises a current collector which can be connected to the traction drive and which so as to feed in traction energy can be brought into galvanic contact with a two-pole overhead contact line of a grounded overhead contact line system, the vehicle must have an electrical protection system so as to avoid dangerous contact voltages at the vehicle frame or at a vehicle part that is conductively connected to said vehicle frame. The protection system must isolate the vehicle frame and for example the vehicle body electrically from the current collector and the traction drive that is in galvanic contact with the overhead contact line. If the protection system fails, dangerous contact voltages can occur at the vehicle frame or at the vehicle body and in the event of a person who is connected to ground coming into contact with said vehicle frame or vehicle body, this could lead to dangerous body currents with injury to or even death of the person involved.

This applies to both hybrid-electric trucks, such as those used in open-cast mining, which are only galvanically connected in sections to an overhead contact line system, and also vehicles, such as electric trolleybuses, which are permanently galvanically connected to an overhead contact line system. In contrast to rail-bound vehicles, whose rail wheels form a conductive connection between vehicle frames and grounded running rails, the vehicle frames of trucks and trolleybuses are not grounded due to their rubber-tired wheels.

A vehicle of type mentioned in the introduction is known from the patent specification EP 3 036 127 B1. This comprises a protection system for avoiding dangerous contact voltages at the vehicle frame. It has a first protection level, which is formed by at least the traction drive being mounted on the vehicle frame in an electrically simply isolated manner, and a second protection level, which has a higher degree of safety and is formed in addition by a galvanically isolating DC converter that is connected between the current collector and the traction drive. The protection system can be switched by means of a switching element by selectively switching in or bridging the DC converter between the first and the second protection level. In different operating states of the vehicle which are characterized by different possible interactions between persons and the vehicle, the protection system satisfies different safety requirements. In a first operating state—for example when the vehicle is at a standstill—it is possible for a driver or a third party to contact the vehicle frame or vehicle body from the outside without simultaneously risking injuries due to the effect of mechanical force; there is a high risk of injury from body currents in this operating state. In a second operating state—for example when the vehicle is traveling at high speed—it is almost impossible for third parties to contact the vehicle frame or vehicle body from the outside without in so doing risking injury from a collision with the vehicle.

SUMMARY OF THE INVENTION

The object of the invention is to provide a vehicle of the type mentioned in the introduction which enables improved power transmission while maintaining the known protection system.

The object is achieved in accordance with the invention by a vehicle of the generic type having the features as claimed. The vehicle comprises a current collector for feeding traction energy from a two-pole overhead contact line system. Moreover, it comprises an electrical or hybrid-electrical traction drive. Furthermore, the vehicle comprises an electrical energy storage device for the intermediate storage of the traction energy that is fed in. The traction drive can be connected to the current collector by way of a first line branch. The traction drive and the energy storage device can be connected to the current collector by way of a second line branch, wherein a galvanically isolating DC converter of the vehicle is interposed in the second line branch. In accordance with the invention, the traction drive and the energy storage device can also be connected to the current collector by way of a third line branch in which a galvanically non-isolating DC converter of the vehicle is interposed. This renders it possible to charge the energy storage device when driving with a lower protection level, i.e. at higher driving speeds, by way of the galvanically non-isolating DC converter. The DC converter without galvanic isolation can be made smaller and lighter for the transmission of high charging powers than a corresponding DC converter with galvanic isolation and it is also cheaper to procure. The galvanically isolating DC converter is used to supply traction and to charge the energy storage device when driving at low driving speeds, which require a higher level of protection against contact voltages. The traction drive can be supplied with traction energy from the overhead contact line system in both protection levels.

In a preferred exemplary embodiment of the vehicle in accordance with the invention, a first switching element for opening and closing the first line branch is connected upstream of the traction drive, a second switching element for opening and closing the second and third line branch is connected upstream of the traction drive, and a third switching element for opening and closing the third Line branch is connected upstream of the galvanically non-isolating DC converter. The arrangement of the switching elements makes it possible—manually by way of a driver's control element, as explained in more detail in the specific exemplary embodiment, or automatically controlled in dependence upon the required protection level—to release or interrupt the flow of energy by way of the various line branches. In the case of an increased protection level, the first switching element and the third switching element are open, while the second switching element is closed. Traction energy can thus flow from the current collector through the second line branch by way of the DC converter with galvanic isolation into the energy storage device and the traction drive. In the case of a lower protection level, the first switching element is closed and the second switching element is open, so that traction energy can be supplied directly to the traction drive from the current collector by way of the first line branch. In this lower protection level, traction energy can continue to flow into the energy storage device by way of the DC converter with galvanic isolation.

In a further preferred exemplary embodiment of the vehicle in accordance with the invention, the traction drive and the energy storage device and, leading respectively therefrom, the first line branch up to the first switching element, the second line branch up to the galvanically isolating DC converter, and the third line branch including the galvanically non-isolating DC converter up to the third switching element are mounted against the vehicle frame with an electrically simple isolation layer. Furthermore, the current collector and, leading respectively therefrom, the first line branch up to the first switching element, the second line branch up to and including the galvanically isolating DC converter, and the third line branch up to the third switching element are mounted against the vehicle frame with an electrically double isolation layer. As a result, vehicle components that in the case of a high protection level are galvanically conductively connected to the high voltage level of the overhead contact line system are electrically double isolated in order to avoid dangerous contact voltages at the vehicle frame or at a vehicle part that is conductively connected to said vehicle frame. An electrically simple isolation is sufficient for the other vehicle components.

Moreover, in a further preferred exemplary embodiment, the vehicle in accordance with the invention further comprises a speed measuring device for detecting the vehicle speed, a control facility that is configured so as to control the first switching element, the second switching element and the third switching element in dependence upon the measured vehicle speed in such a manner that, below a predeterminable threshold value of the vehicle speed, the first switching element and the third switching element open and the second switching element closes, and that above the threshold value the first switching element closes and the second switching element opens.

For example, 30 km/h can be specified as the threshold value for the driving speed. If the vehicle is at a standstill or if it is moving at a speed below the threshold value, then the protection system is switched to the higher protection level with increased electrical safety, since here the consequences of a body current injury are more serious than the consequences of a body collision injury. If the threshold value is exceeded, the protection system switches to the lower protection level, since in this operating state even a collision accident is likely to result in enormous bodily injury. In lieu of or in addition to the speed measuring device, the vehicle can also comprise other sensor facilities for detecting an operating state of the vehicle, wherein the detected state variables of the vehicle are assigned corresponding threshold values for switching between the protection levels. Thus, a current measuring device can be provided for detecting the current strength of a traction current that develops when energy is fed in from the overhead contact line, wherein it is possible to determine a threshold value for the traction current drawn in or the traction power that is fed in. It is also possible to provide a door closed sensor for detecting the closed state of a vehicle door and/or a seat occupancy sensor for detecting the occupancy of a vehicle seat and/or a belt locked sensor for detecting the closed state of a seat belt of the vehicle seat, wherein the protection level is switched in the case of the vehicle door being closed from the inside and/or in the case of a vehicle seat being occupied and/or in the case of the seat belt being closed.

In a further preferred exemplary embodiment of the vehicle in accordance with the invention, the control facility is moreover configured so that the third switching element also closes above the threshold value. In the case of a lower protection level, the charging power for the energy storage device can thus be increased in that energy can flow from the current collector by way of the parallel, third line branch with the interposition of the DC converter without galvanic isolation.

Moreover, in a further preferred exemplary embodiment, the vehicle in accordance with the invention comprises a monitoring facility for detecting and signaling isolation faults in the single isolation layer and/or in the double isolation layer. In order to further increase the operational safety of vehicles in accordance with the invention, the single or double insulation is monitored for faults. If an isolation fault is detected and displayed to the driver, measures can be initiated immediately, for example the driver can be instructed to drive the vehicle to a repair shop.

Further properties and advantages of the invention are disclosed in the following description of an exemplary embodiment with reference to the drawing, in the single figure of which a circuit diagram of a vehicle in accordance with the invention having a protection system is illustrated.

BRIEF DESCRIPTION OF THE FIGURE

In accordance with the figure, the figure does not illustrate parts known per se of the vehicle 1 in accordance with the invention, which can be for example a heavy commercial vehicle, said parts being such as a vehicle frame, which carries wheel axles having rubber-tired wheels, a driver's cab having vehicle doors, vehicle seats and seat belts and a vehicle body for transporting goods. Moreover, the vehicle frame carries a traction drive 2, which can be purely electric or hybrid-electric and the torque of which can be transmitted to wheels by way of a transmission that is likewise not illustrated. For route sections having a two-pole overhead contact line system 3, of which two overhead contact wires that hang over the roadway and are designed as outward and return conductors are illustrated by a common line in the figure, the vehicle 1 comprises a current collector 4 for the external feed of traction energy. The current collector 4 has a framework that can be raised and lowered and carries two rockers having contact strips. By means of the contact strips, a galvanic contact is established between the current collector 4 and the overhead contact line system 3 in order to feed traction energy into the vehicle 1 or to feedback braking energy. If the galvanic contact is interrupted between the current collector 4 and the contact line system 3 or on sections of the route without an overhead contact line system 3, the hybrid electric traction drive 2 can be supplied with traction energy, for example by way of a diesel unit or from an energy storage device 5 of the vehicle 1, for example electric double-layer capacitors and/or batteries, possibly nickel-metal-hybrid-batteries. The energy storage device 5 holds between 15 kWh and 80 kWh, for example.

DETAILED DESCRIPTION OF THE INVENTION

The vehicle has an electrical protection system for avoiding dangerous contact voltages at the vehicle frame or at vehicle parts that are connected to said vehicle frame in an electrically conductive manner, possibly dangerous contact voltages at a driver's cab or a vehicle body for transporting goods. The vehicle frame is not grounded due to the vehicle standing on the ground in an isolated manner by way of rubber-tired wheels. So that, in the case of a galvanic contact produced between the single-pole grounded overhead contact line system 3 and the current collector 4 and consequently the traction drive 2, dangerous contact voltages cannot occur at the vehicle frame, the protection system provides an electrical separation or isolation between the vehicle parts that can be conductively connected to the current collector 4 and the traction drive 2 and the vehicle parts that are conductively connected to the vehicle frame. If the protective system fails, life-threatening body currents can occur in the event of a body contact with the vehicle frame by a person who is standing on ground and contacting the vehicle 1 from the outside. The protection system has a lower protection level and a higher protection level. The latter has a higher degree of electrical safety against dangerous contact voltages than the lower protection level.

The lower protection level is formed by the traction drive 2 being mounted on the vehicle frame in an electrically simple isolated manner. In addition to the traction drive 2, the energy storage device 5 and an inverter 7 that is connected upstream of the traction drive 2 for converting direct voltage into alternating voltage belong to the area having an electrically simple isolation layer 6. In addition to the simple isolation layer 6, the higher protection level is formed by a galvanically isolating DC converter 8 that is connected between the current collector 4 and the traction drive 2. The current collector 4 and galvanically isolating DC converter 8 belong to an area having a double isolation layer 9.

In the higher protection level, all vehicle parts that are electrically connected to the overhead contact line system 3 are double isolated from the vehicle frame, either by being mounted in a double-isolated manner or by a galvanic isolation. The double isolation is continuously monitored by a suitable monitoring facility 10. In the lower protection level, some or all of the vehicle parts that are electrically connected to the overhead contact line system 3 are isolated from the vehicle frame in a simple manner. This isolation can also be monitored by monitoring facilities 10.

The traction drive 2 can be connected to the current collector 4 by way of a first line branch 11, wherein a first switching element 12 for opening and closing the first line branch 11 is connected upstream of the traction drive 2. The traction drive 2 and the energy storage device 6 can be connected to the current collector 4 by way of a second line branch 13 in which the galvanically isolating DC converter 8 is interposed. The traction drive 2 and the energy storage device 5 can be connected to the current collector 4 parallel a third line branch 14 in which a galvanically non-isolating DC converter 15 is interposed. A second switching element 16 for opening and closing the second line branch 13 and the third line branch 14 are connected upstream of the traction drive 2. A third switching element 17 for opening and closing the third line branch 14 is connected upstream of the galvanically non-isolating DC converter 15. Switching between the lower and higher protection level is accomplished by actuating the first switching element 12 and the second switching element 16—and in fact depending upon whether a currently measured driving speed is above or below a predefinable threshold value of 30 km/h for example.

When the vehicle 1 is at a standstill or at driving speeds up to the threshold value, it is possible for the driver or a third party who is standing outside to contact the vehicle 1 from the outside without simultaneously risking other hazards that have a high degree of damage. At driving speeds above the threshold value, it is not possible or almost impossible for third parties who are standing outside to contact the vehicle 1 from the outside without in so doing simultaneously causing serious mechanical damage or an accident with bodily injury or risking a high probability of an occurrence. Further distinctions between operating states of the vehicle 1 and assigned protection levels can be implemented in the same way.

The galvanically isolating DC converter 8 that is installed in the vehicle 1 is used to supply the traction drive 2 in the case of low driving speeds. In this case, by opening the first switching element 12 and closing the second switching element 16, the higher protection level is switched, which is used for starting up and driving at low driving speeds. As a result, a galvanically isolating DC converter 8 having a comparatively low nominal power of 30 kW, for example, can be used. In the case of higher driving speeds, the lower protection level is switched by opening the second switching element 16 and closing the first switching element 12 in that the galvanically isolating DC converter 8 is bridged by the first branch 11 and the traction energy is drawn directly from the overhead contact line system 3. The vehicle parts that have a single isolation layer 6 are now no longer separated by a galvanic isolation from the area of the double isolation layer 9 and the external overhead contact line system 3.

In the case of a low driving speed, the energy storage device 5 is charged from the current collector 4 by way of the DC converter 8 with galvanic isolation in the second line branch 13. In addition, the DC converter 8 is used in order to drive at a lower driving speed. In addition, it is also possible to use traction energy from the energy storage device 5 or from a diesel unit of the vehicle 1. Also in the case of driving speeds above the threshold value in the lower protection level, where traction energy is primarily drawn directly from the overhead contact line system 3 by way of the first line branch 11, the energy that is present in the energy storage device 5 is available as traction energy. In both protection levels, the DC converter 8 stabilizes the energy feed for the energy storage device 5. In order to be able to charge the energy storage device 5 with a higher charging power, the third switching element 17 is closed so that traction energy can flow from the current collector 4 into the energy storage device 5 by way of the galvanically non-isolating DC converter 15 in the third line branch 14. A DC converter 15 without galvanic isolation can transmit a nominal power of 150 kW, for example, and at the same time have a small structural volume and low weight.

Switching between the protection levels can be achieved by automatic control or also by manual actuation. Thus, irrespective of the driving speed, the driver can actuate by way of a control element on the vehicle when leaving the public driving area and entering a non-public driving area in which an instruction or other technical measures prevent third parties contacting the vehicle from outside. It is also possible, for example when driving in defined areas, in the case of different overhead contact line systems or in the event of accidents, for third parties to perform the switch between said protection levels by way of a remote-controlled operating facility.

In the case of a lowered current collector 4, both the first switching element 12 and also the second switching element 16 can be opened in order to find isolation faults on the drive system side. In addition, this switch position serves to adapt the voltage level on the drive system side to that of the overhead contact line system 3 in order to prevent a voltage jump in the case of switching between the protection levels.

The invention claimed is:
1. A vehicle, comprising:
a current collector for feeding traction energy from a two-pole overhead contact line system;
an electric or hybrid-electric traction drive carried by a non-grounded vehicle frame;
an electrical energy storage device for intermediately storing traction energy fed in through said current collector;
a first line branch for connecting said traction drive to said current collector;
a second line branch for connecting said traction drive and said energy storage device to said current collector, and a galvanically isolating DC converter interposed in said second line branch;
a first switching element for selectively opening and closing said first line branch connected upstream of said traction drive;
a third line branch for connecting said traction drive and said energy storage device to said current collector, and a galvanically non-isolating DC converter interposed in said third line branch;
a second switching element for opening and closing said second and third line branches connected upstream of said traction drive;
a third switching element for opening and closing said third line branch connected upstream of said galvanically non-isolating DC converter;
said first line branch, said second line branch, and said third line branch being connected in parallel;
a speed measuring device for detecting a vehicle speed; and
a control facility configured to control said first switching element, said second switching element, and said third switching element in dependence upon the measured vehicle speed according to the following:
below a predeterminable threshold value for the vehicle speed, to open said first switching element and said third switching element, and to close said second switching element; and
above the threshold value for the vehicle speed, to close said first switching element and to open said second switching element.

2. The vehicle according to claim 1, wherein:
said traction drive and said energy storage device and, leading respectively therefrom, said first line branch up to said first switching element, said second line branch up to said galvanically isolating DC converter, and said third line branch including said galvanically non-isolating DC converter up to said third switching element, are mounted against a vehicle frame of the vehicle with an electrically simple insulation layer; and
said current collector and, leading respectively therefrom, said first line branch up to said first switching element, said second line branch up to and including said galvanically isolating DC converter, and said third line branch up to said third switching element, are mounted against the vehicle frame of the vehicle with an electrically double insulation layer.

3. The vehicle according to claim 2, further comprising a monitoring facility for detecting and signaling insulation faults in said single insulation layer and/or in said double insulation layer.

4. The vehicle according to claim 1, wherein said control facility is configured to also close said third switching element above the threshold value.

* * * * *